United States Patent
Stephens et al.

(10) Patent No.: US 7,245,705 B2
(45) Date of Patent: Jul. 17, 2007

(54) INTERNET PROTOCOL (IP) RELAY SYSTEM AND METHOD

(75) Inventors: Greg E. Stephens, Shelton, NE (US); Wayne D. Hinerman, Hastings, NE (US)

(73) Assignee: Hamilton Relay, Inc., Aurora, NE (US)

( * ) Notice: Subject to any disclaimer, the term of this patent is extended or adjusted under 35 U.S.C. 154(b) by 184 days.

(21) Appl. No.: 10/788,237

(22) Filed: Feb. 26, 2004

(65) Prior Publication Data

US 2005/0190893 A1 Sep. 1, 2005

(51) Int. Cl.
*H04M 11/00* (2006.01)

(52) U.S. Cl. .................. 379/52; 379/90.01; 370/352

(58) Field of Classification Search .............. 379/52, 379/93.15, 90.01; 370/352
See application file for complete search history.

(56) References Cited

U.S. PATENT DOCUMENTS

| | | | |
|---|---|---|---|
| 4,777,469 A | 10/1988 | Engelke et al. |
| 4,897,868 A | 1/1990 | Engelke et al. |
| 4,959,847 A | 9/1990 | Engelke et al. |
| 5,325,417 A | 6/1994 | Engelke et al. |
| 5,327,479 A | 7/1994 | Engelke et al. |
| 5,351,288 A | 9/1994 | Engelke et al. |
| 5,432,837 A | 7/1995 | Engelke et al. |
| D364,865 S | 12/1995 | Engelke et al. |
| 5,517,548 A | 5/1996 | Engelke et al. |
| 5,581,593 A | 12/1996 | Engelke et al. |
| 5,604,786 A | 2/1997 | Engelke et al. |
| 5,724,405 A | 3/1998 | Engelke et al. |
| 5,809,425 A | 9/1998 | Colwell et al. |
| D405,793 S | 2/1999 | Engelke et al. |
| 5,909,482 A | 6/1999 | Engelke |
| 5,974,116 A | 10/1999 | Engelke et al. |
| 5,978,754 A | 11/1999 | Colwell et al. |
| 6,075,841 A | 6/2000 | Engelke et al. |
| 6,075,842 A | 6/2000 | Engelke et al. |
| 6,233,314 B1 | 5/2001 | Engelke |
| 6,307,921 B1 | 10/2001 | Engelke et al. |
| 6,493,426 B2 | 12/2002 | Engelke et al. |
| 6,504,910 B1 | 1/2003 | Engelke et al. |
| 6,510,206 B2 | 1/2003 | Engelke et al. |
| 6,546,082 B1 | 4/2003 | Alcendor et al. |
| 6,549,611 B2 | 4/2003 | Engelke et al. |
| 6,567,503 B2 | 5/2003 | Engelke et al. |
| 6,594,346 B2 | 7/2003 | Engelke |

(Continued)

*Primary Examiner*—Stella Woo
(74) *Attorney, Agent, or Firm*—Foley & Lardner LLP

(57) ABSTRACT

A communications system allows individuals who are deaf, hard of hearing or speech disabled to use computers and other web devices to connect to an Internet Portal in order to place a call. The system relays communications between a first device and a second device utilizing a third device as an intermediary where the second device is a telephone on a plain old telephone system network and the communications between the first device and third device involves the Internet. The system includes a first input and output communication device coupled to a network and is configured to send and receive communication messages, a server device that receives a session request from the first input and output communication device and sends a call to a call distribution device, a second input and output communication device coupled to a plain old telephone system, and a third input and communicating with the first input and output communication device using a chat room interface.

11 Claims, 6 Drawing Sheets

U.S. PATENT DOCUMENTS

| | | |
|---|---|---|
| 6,950,500 B1 * | 9/2005 | Chaturvedi et al. ............ 379/52 |
| 2001/0004396 A1 | 6/2001 | Engelke |
| 2001/0005825 A1 | 6/2001 | Engelke et al. |
| 2002/0064256 A1 | 5/2002 | Engelke et al. |
| 2002/0080926 A1 | 6/2002 | Engelke et al. |
| 2002/0085685 A1 | 7/2002 | Engelke et al. |
| 2002/0114429 A1 | 8/2002 | Engelke et al. |
| 2003/0069997 A1 | 4/2003 | Bravin et al. |
| 2005/0047394 A1 * | 3/2005 | Hodson et al. ............. 370/352 |
| 2005/0094775 A1 * | 5/2005 | Smith et al. .................. 379/52 |
| 2005/0094776 A1 * | 5/2005 | Haldeman et al. ............ 379/52 |
| 2005/0188110 A1 * | 8/2005 | Hollatz ....................... 709/244 |

* cited by examiner

INTERNET PROTOCOL (IP) RELAY SYSTEM AND METHOD

FIELD OF THE INVENTION

The present invention relates to communication methods and systems for the deaf, hearing and/or speech impaired. More specifically, the present invention relates to an Internet protocol (IP) relay system and method.

BACKGROUND OF THE INVENTION

Various technologies have been developed to enable hearing-impaired individuals to communicate using telephone communication systems. For example, text telephones, such as Telecommunication Devices for the Deaf (TDD), enable deaf, hard of hearing, speech-impaired individuals to communicate over the telephone with hearing and speaking parties using conventional telephones. In TDD systems, the hearing-impaired person typically uses a telephone teletype keyboard or TTY, a specially equipped device with a keyboard, to type messages and a text display for presenting responses to the caller.

TDD devices typically require a Weitbrecht/Baudot-compatible modem. In general, a computer cannot communicate directly to TDD because each uses a different coding system to transmit messages over telephone lines. Modems and software are available that can be installed on a computer that allow the computer to communicate directly with a Baudot modem and a TDD. However, such configurations do not solve the need of a hearing-impaired person being able to call anyone at anytime.

Telecommunication relay services or dual party relay services enable deaf, hard of hearing, speech-impaired individuals to employ text telephones for engaging in a communication session over a telephone network with a person who has a conventional voice telephone. Relay services involve a hearing-impaired individual using a keyboard to communicate and a display device to understand what is being said by the other party. The hearing person hears what is being said and uses his voice to communicate. A relay operator acts as the interface in this situation. The relay operator relays information from one communication protocol to another. For example, the relay operator types what the hearing person says and sends the text to the hearing-impaired person. The relay operator reads aloud text messages from the hearing-impaired person so that the hearing person can hear the message.

There is a need for an improved relay system. Further, there is a need to improve telephone relay conversations by enabling the relay operator to use computerize chat interfaces to communicate with the hearing-impaired individual. Even further, there is a need to utilize Internet technologies to enable IP based Internet relay services.

SUMMARY OF THE INVENTION

A communications system allows individuals who are deaf, hard of hearing or speech disabled to use computers and other web devices to connect to an Internet Portal in order to place a call to any standard telephone user, VCO (voice carry over) user, or HCO (hearing carry over) user. An exemplary embodiment relates to a system for relaying communications between a first device and a second device utilizing a third device as an intermediary where the second device is a telephone on a plain old telephone system network and the communications between the first device and third device involves the Internet. The system includes a first input and output communication device coupled to a network and is configured to send and receive communication messages, a server device that receives a session request from the first input and output communication device and sends a call to a call distribution device, a second input and output communication device coupled to a plain old telephone system, and a third input and output device communicating with the first input and output communication device using a chat room interface.

Another exemplary embodiment relates to a method of relaying communications between a first device and a second device utilizing a relay device as an intermediary where the second device is a telephone on a plain old telephone system network and the first device and the relay device utilize the Internet in communication. The method includes communicating with a first input and output communication device coupled to a network where the first input and output device is configured to send and receive Internet communication messages, receiving the Internet communication messages at a relay station, establishing a communication session between the first input and output communication device and a communications assistant at the relay station, and communicating with a second input and output communication device over a plain old telephone system network communications based on the communications received from the first input and output communication device.

Still another exemplary embodiment relates to a system for relaying communications between a first device and a second device utilizing a relay device as an intermediary where the second device is a telephone on a plain old telephone system network and the first device and the relay device utilize the Internet in communication. The system includes means for communicating with a first input and output communication device coupled to a network where the first input and output device is configured to send and receive Internet communication messages, means for receiving the Internet communication messages at a relay station and means for establishing a communication session between the first input and output communication device and the relay station, and means for communicating with a second input and output communication device over a plain old telephone system network communications based on the communications received from the first input and output communication device.

Other principle features and advantages of the invention will become apparent to those skilled in the art upon review of the following drawings, the detailed description, and the appended claims.

BRIEF DESCRIPTION OF THE DRAWINGS

The exemplary embodiments will be described with reference to the accompanying drawings, wherein like numerals denote like elements.

DETAILED DESCRIPTION OF EXEMPLARY EMBODIMENTS

Figure 1:
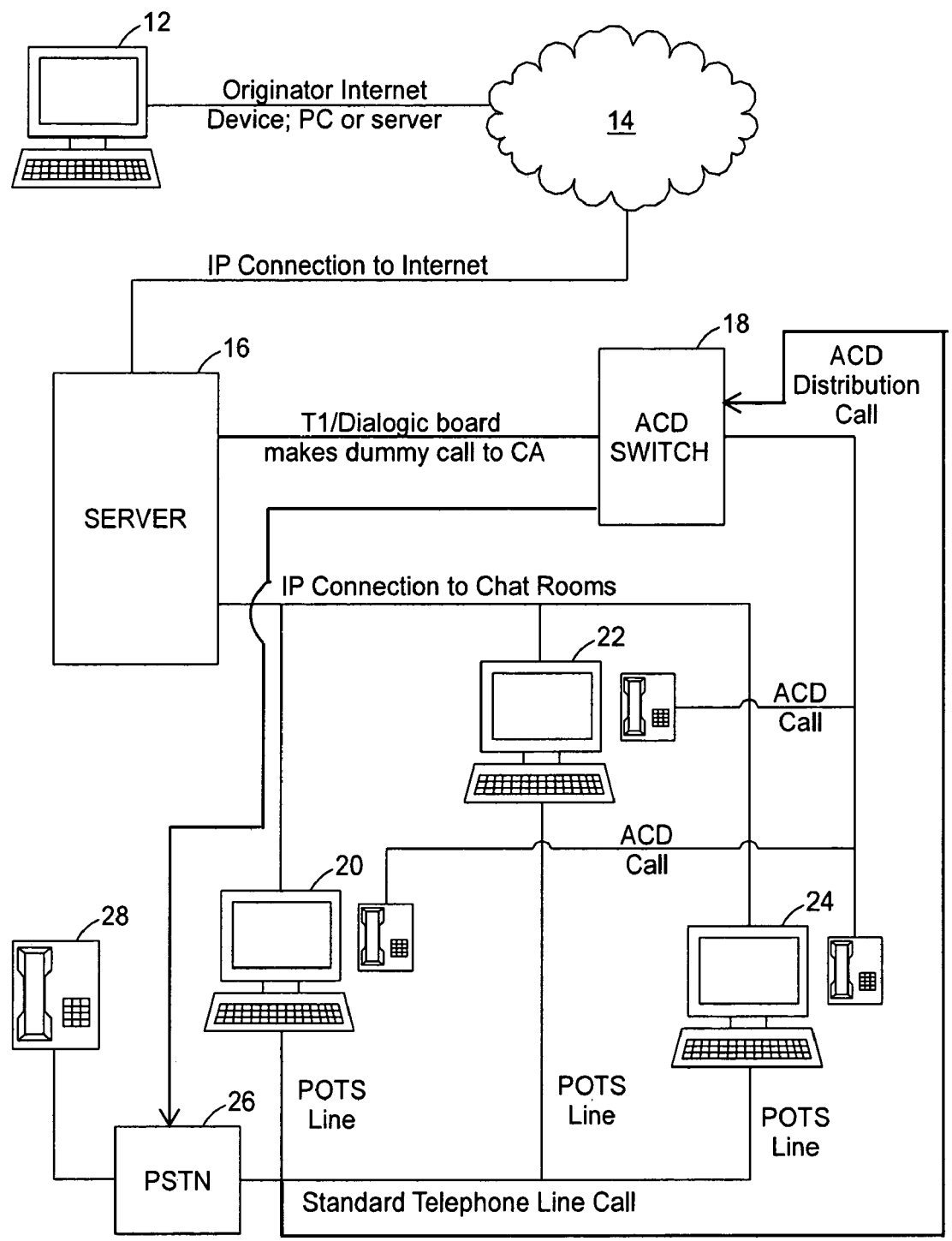
FIG. 1 is a diagram of an Internet protocol (IP) relay system in accordance with an exemplary embodiment.

FIG. 1 illustrates an exemplary Internet protocol (IP) relay system including a personal computer (PC) 12, a network 14, a server 16, an Automated Call Distribution (ACD) router server 18, workstation computers 20, 22, and 24, a public switched telephone network (PSTN) 26, and a standard telephone 28. The PC 12 is coupled to the network 14 via a connection, such as a broadband communication connection. The network 14 is preferably the Internet. The server 16 is coupled to the network 14 and receives data from the network 14.

The PC 12 can be replaced by any of a variety of devices, including, for example, a handheld wireless two-way communication device (such as a two-way pager), or any internet capable device such as a library workstation computer or a kiosk. In an exemplary embodiment, workstation computers 20, 22, and 24 constitute communication assistant (CA) workstations.

According to an exemplary embodiment, a hearing or speech impaired individual initiates a communication session through an Internet web page designed for this purpose. In an exemplary embodiment, once the communication session is initiated from PC 12, an application is started on the server 16 that determines which telephone lines are available and places a dummy telephone call to an Automated Call Distribution (ACD) router server 18 over the chosen available line. The server 16 connects the originator communicating via PC 12 with a chat room that corresponds to the chosen telephone line where the originator waits for a Communications Assistant (CA) to join the chat session. The ACD router server 18 receives the dummy call from the server 16 and routes the call to the next available CA at workstation 20, 22, or 24. Alternatively, no dummy call is used and workstations 20, 22, and 24 are designated to a particular chat server.

The workstation 20, 22, or 24 processes the call, recognizing the dummy number through DNIS (Dialed Number Identification Service) as an IP call, and joins the chat room associated with the DNIS, the number chosen by the server 16. Once the CA joins the originator in the chat room, a client running on the PC 12 and a client running on a CA workstation (workstation 20, 22, or 24) perform a handshake process that can include any instructions or other information the hearing impaired originator may have entered when initiating the call. The CA completes a call for the originator over a public switched telephone network (PSTN) and a conversation between the originator and a called person can begin. When the call is ended, the CA leaves the chat room, triggering software processes that clear the chat channel and clear the DNIS dummy call, readying the line and the CA for another call.

The connection between the originator and the CA is an IP to IP connection. Preferably, the messages are not converted to baudot or other communication protocol by intervening software. The system allows for VCO (Voice Carry Over)/HCO (Hearing Carry Over) capability directly over the Internet, without a second telephone line being utilized. The architecture can also allow for a hearing telephone user to place a call to the hearing impaired Internet user. Conventional systems convert IP message packets to modem or baudot signals. As such, these conventional systems cannot perform VCO or HCO without using an additional telephone line. The system described with reference to FIG. 1 makes the conversation less trouble prone and easier to troubleshoot. The need to convert the call to modem or baudot signals, use an extra phone line, or use an extra modem is eliminated.

Figure 2:
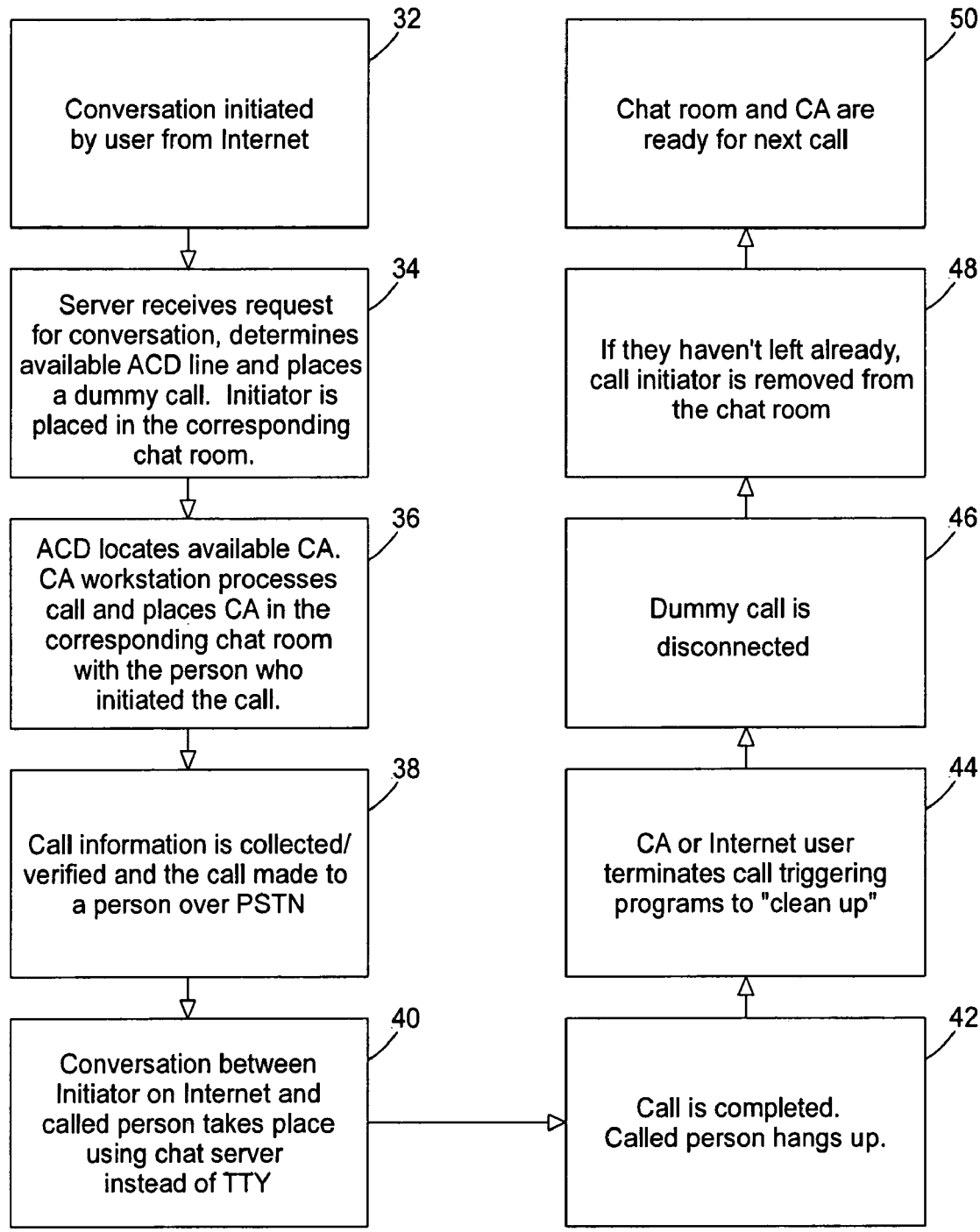
FIG. 2 is a flow diagram of an exemplary process of operation for the IP relay system of FIG. 1 in accordance with an exemplary embodiment.

FIG. 2 illustrates a flow diagram of an exemplary process of operation for the IP relay system of FIG. 1. Additional, fewer, or different operations may be performed. In an operation 32, a conversation is initiated by a user. The call can be initiated by a hearing impaired person by logging onto the Internet from a web-enabled Internet browser and following the instructions to make a call which connects them to the server. In an operation 34, the server receives the request for conversation, determines an available Automated Call Distribution (ACD) line, and places a dummy call. The initiator is placed in a corresponding chat room. Alternatively, no dummy call is placed, rather the chat room assignment is made in software.

Caller information such as speed call numbers and special greetings can be stored in a profile at the user's option. A PIN protects the originator's profile and when provided, information provided earlier by the originator is available for modification as well as to the CA to help speed the call. In an operation 36, the ACD locates an available CA. The available CA workstations processes the call and places the CA in the corresponding chat room with the person who initiated the call.

In an operation 38, call information is collected and verified and a call is made to a person over the PSTN. In one embodiment, the media to the originating PC is text. Because of the IP to IP connectivity, other embodiments may include a PC with the appropriate software, speakers and/or microphones to enable the conversation to be VCO or HCO enabled. Further, a call can be initiated by a hearing person from the PSTN, enter the system as any other call would but be connected to the hearing or speech impaired person by the reverse process described. In such an embodiment, if the hearing impaired person is not logged on to the network, a message can be left for the next time they do log onto the system (if they are registered and the proper passwords are in place) to complete the call back to the PSTN phone number.

In an operation 40, a conversation between the initiator on the Internet and the called person takes place using a chat server instead of TTY techniques and systems. Once the call is completed in an operation 42, the called person hangs up and the CA or Internet user terminates the call in an operation 44, triggering programs to prepare for new calls. An interface, such as a Dialogic T1 board, can be used to place a dummy call into the ACD system. In an operation 46, a connection made by such an interface is disconnected. In an operation 48, if the call initiator has not left the chat room already, the system removes him or her and, in an operation 50, the chat room and the CA are ready for another call.

Figure 3:
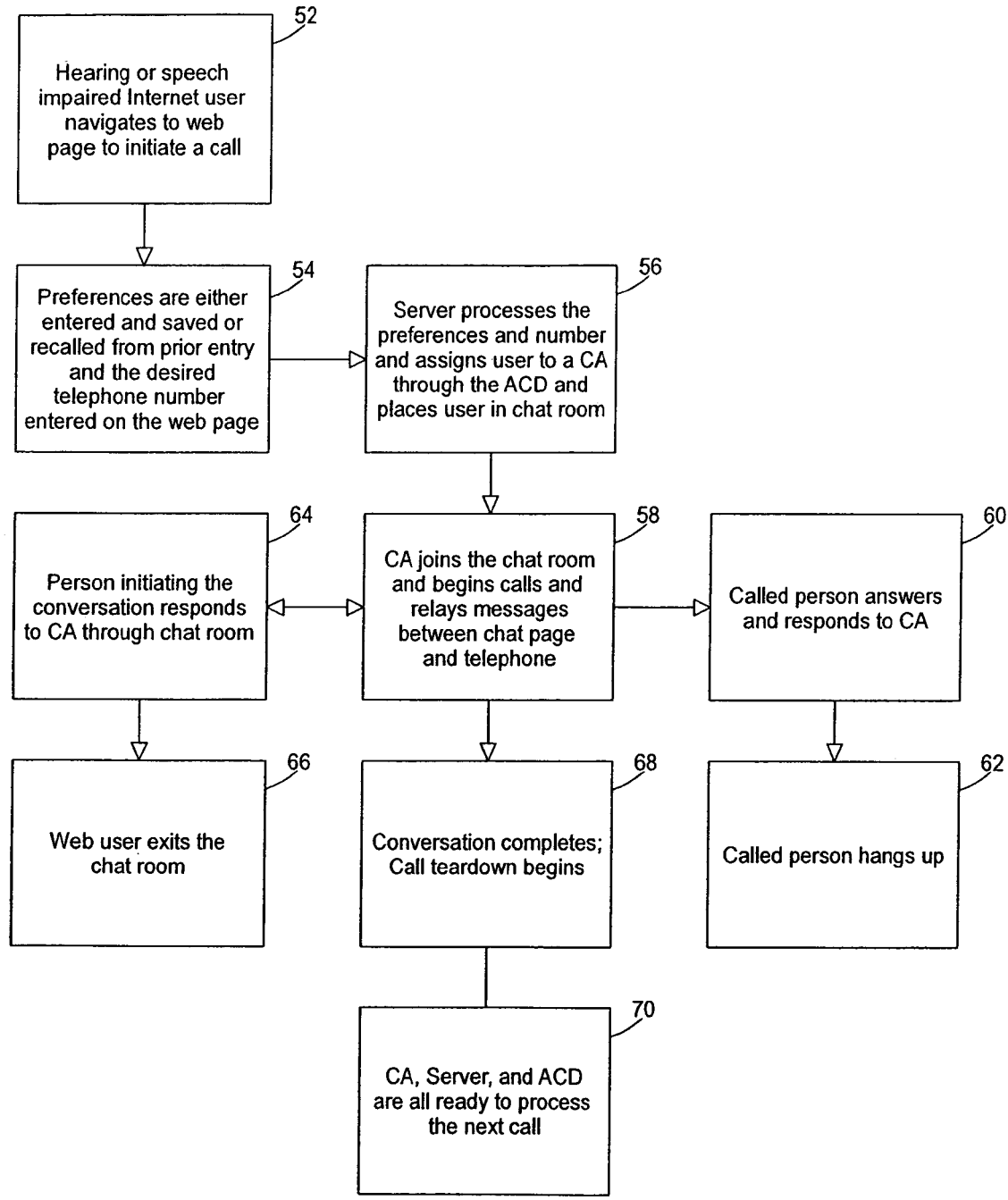
FIG. 3 is a flow diagram of exemplary operations in the IP relay system of FIG. 1 in accordance with another exemplary embodiment.

FIG. 3 illustrates a flow diagram of an exemplary process of operation for the IP relay system of FIG. 1. Additional, fewer, or different operations may be performed, depending on the embodiment implemented. In an operation 52, a hearing or speech impaired Internet user navigates to a web page to initiate a call. In an operation 54, preferences are either entered and saved or recalled from a prior entry and a desired telephone number is entered onto the web page. In an operation 56, a server processes the preferences and the selected number and assigns the user to a CA through the ACD and places the user in a chat room.

In an operation 58, the communications assistant (CA) joins the chat room and begins calls. The CA relays messages between the chat page and the telephone. The hearing impaired person types a message into the chat room, the CA reads the message into the telephone to the called person, the called person responds, the CA types the responses of the called person in the chat room, and the hearing impaired person reads the typed messages. In an operation 60, the called person answers and responds to the CA and, in an operation 62, the called person hangs up, ending the communication session. In an operation 64, the person initiating the conversation responds to the CA through the chat room and, in an operation 66, the web user exits the chat room, ending the communication session.

In an operation 68, when the conversation is complete, a call teardown process begins. A call teardown can involve disconnecting the dummy call established to identify a CA, emptying the chat room of any remaining participants, and identifying the CA as available. In an operation 70, the CA, the server, and the ACD are ready to process a new call.

Figure 4:
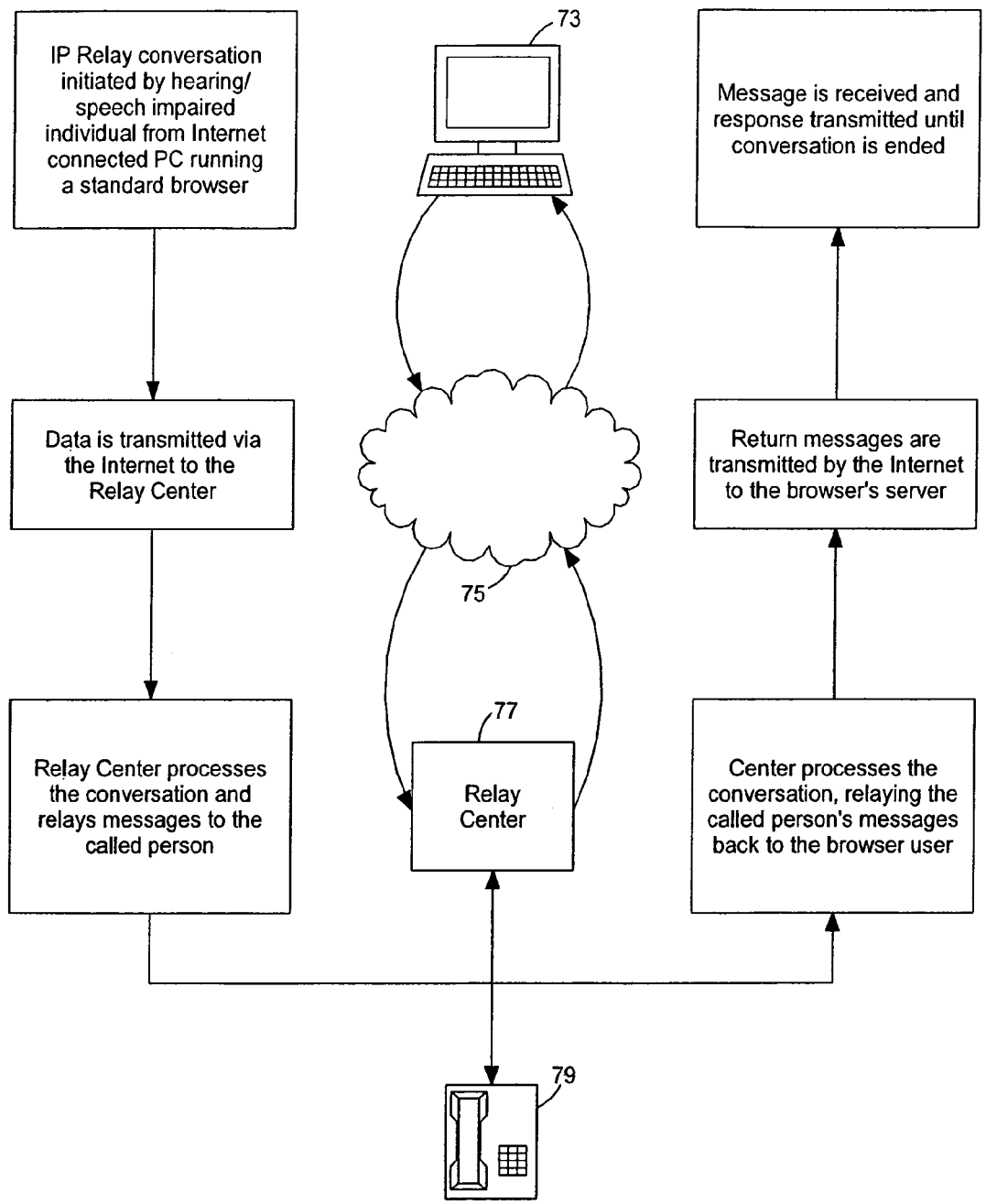
FIG. 4 is a diagram of exemplary operations in the IP relay system of FIG. 1 in accordance with an Internet browser exemplary embodiment.

FIG. 4 illustrates an Internet browser implementation of the IP relay system. An IP relay conversation is initiated by a hearing/speech impaired individual from an Internet-connected computer 73 running a standard browser. Data is transmitted via the Internet 75 to a relay center 77. An exemplary relay center 77 is described with respect to FIG. 1 as including a server, workstations, and a router server. The relay center 77 processes the conversation and relays messages to the called person who communicates using a standard telephone 79.

The relay center 77 processes the conversation, relaying the called person's messages back to the browser user. The return messages are transmitted by the Internet 75 to the relay center's server. The message is received and the response transmitted until the conversation ends.

Figure 5:
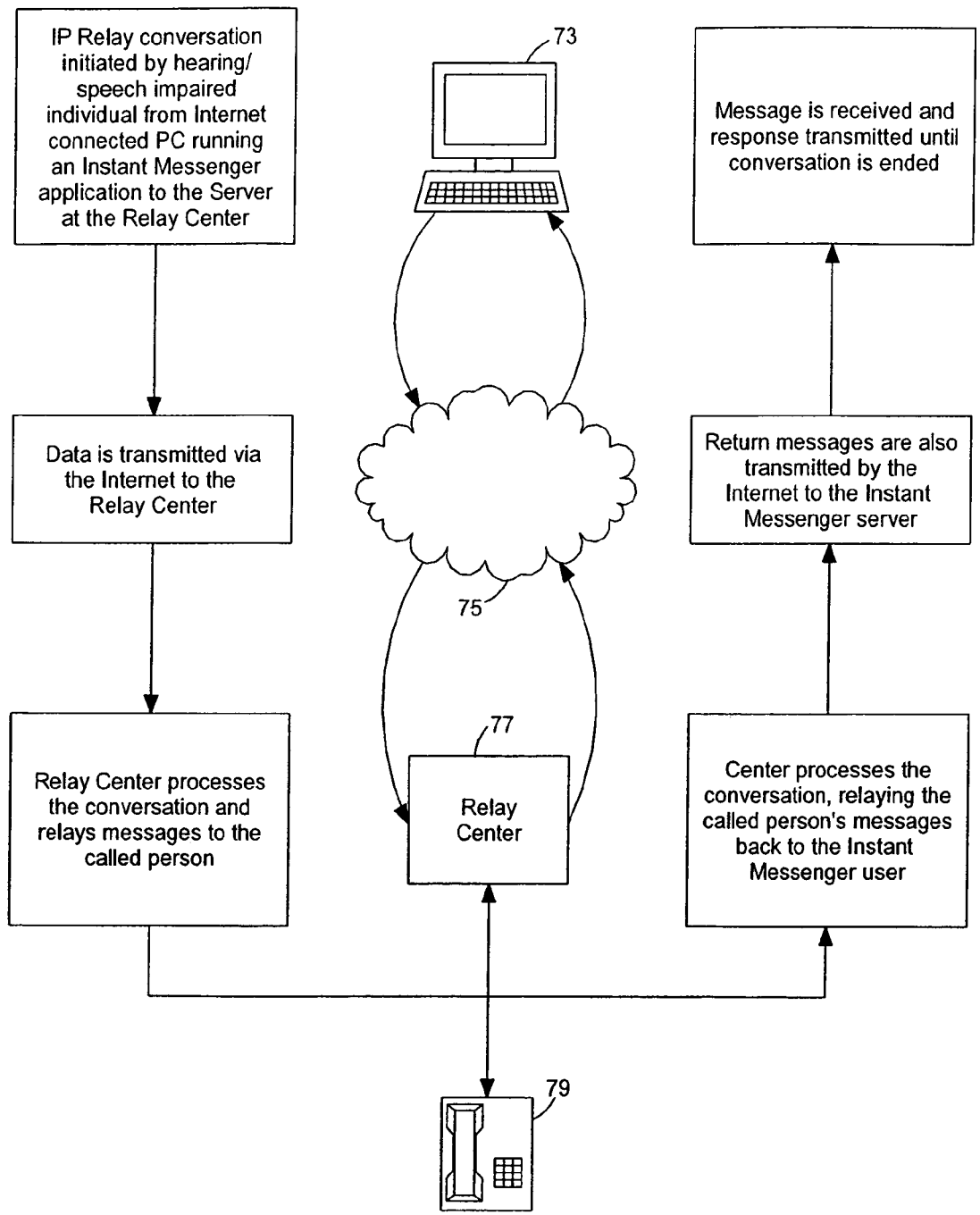
FIG. 5 is a diagram of exemplary operations in the IP relay system of FIG. 1 in accordance with an instant messenger exemplary embodiment.

FIG. 5 illustrates an instant messaging implementation of the IP relay system. An IP relay conversation is initiated by a hearing/speech impaired individual from the Internet-connected computer 73 running an instant messenger application. Data is transmitted via the Internet 75 to a relay center 77. The relay center 77 processes the conversation and relays messages to the called person who communicates using a standard telephone 79.

The relay center 77 processes the conversation, relaying the called person's messages back to the instant messenger user. The return messages are transmitted by the Internet 75 to the browser's server. The message is received and the response transmitted until the conversation ends.

Figure 6:
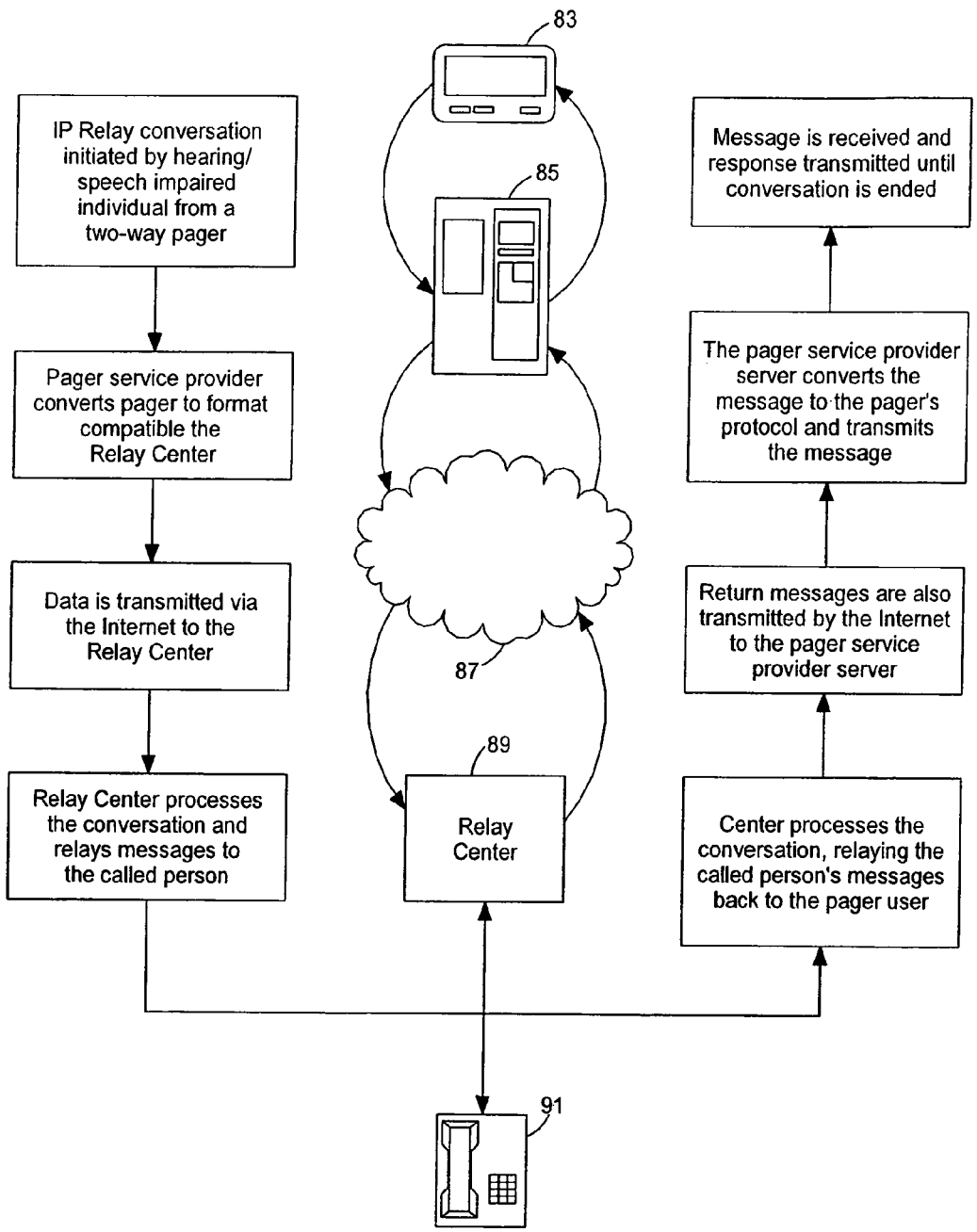
FIG. 6 is a diagram of exemplary operations in the IP relay system of FIG. 1 in accordance with a two-way pager exemplary embodiment.

FIG. 6 illustrates a two-way pager implementation of the IP relay system. An IP relay conversation is initiated by a hearing/speech impaired individual from a two-way pager 83. A pager service provider at a server 85 converts the page to a format compatible with a relay center 89. Data is transmitted via a network 87 (such as the Internet) to a relay center 89. The relay center 89 processes the conversation and relays messages to the called person who communicates using a standard telephone 91.

The relay center 89 processes the conversation, relaying the called person's messages back to the pager user. The return messages are transmitted by the network 87 to the pager service provider server. The pager service provider server converts the message to the pager's protocol and transmits the message. The message is received at the pager 83 and the response is transmitted until the conversation ends.

In the description, for purposes of explanation, numerous specific details are set forth to provide a thorough understanding of exemplary embodiments of the invention. It will be evident, however, to one skilled in the art that the invention may be practiced without these specific details. In other instances, well-known structures and devices are shown in block diagram form to facilitate description of the exemplary embodiments.

It is understood that although the detailed drawings and specific examples describe exemplary embodiments of an Internet protocol (IP) relay system and method, they are for purposes of illustration only. The exemplary embodiments are not limited to the precise details and descriptions described herein. For example, although particular devices and structures are described, other devices and structures could be utilized according to the principles of the present invention. Various modifications may be made and the details disclosed without departing from the spirit of the invention as defined in the following claims.

What is claimed is:

1. A system for relaying communications between a first device and a second device utilizing a third device as an intermediary where the second device is a telephone on a plain old telephone system network and the communications between the first device and third device involves the Internet, the system comprising:

a first input and output communication device coupled to a network and being configured to send and receive communication messages;

a server device that receives a session request from the first input and output communication device and sends a call to a call distribution device;

a second input and output communication device coupled to a plain old telephone system; and a third input and output device communicating with the first input and output communication device using a chat room interface, wherein the communication between the first input and output communication device and the third input and output device is done without analog communication, the third input and output communication device relaying communication messages from the first input and output communication device to the second input and output communication device by voice over a public switched telephone network, and further wherein the call distribution device establishes a chat session using a dummy call from the server device.

2. The system of claim 1, wherein the communication between the first input and output communication device and the third input and output communication device is communicated using Internet protocol (IP) and the call distribution device establishes a chat session using IP.

3. The system of claim 1, wherein the communication between the first input and output communication device and the third input and output communication device further comprises IP based communication.

4. The system of claim 1, wherein the first input and output communication device comprises a text screen display and a method to submit a text response such as a keyboards or stylus interface.

5. The system of claim 1, wherein the first input and output communication device comprises a wireless communication device.

6. The system of claim 1, wherein the call distribution device comprises a switch that directs communication between the first and third input and output communication devices.

7. The system of claim 6, wherein the switch tracks minutes elapsed in the communication for billing purposes.

8. The system of claim 1, wherein the communication between the first and input and output communication devices comprises instant messaging messages.

9. A system for relaying communications between a first device and a second device utilizing a relay device as an intermediary where the second device is a telephone on a plain old telephone system network and the first device and the relay device utilize the Internet in communication, the system comprising:

means for communicating with a first input and output communication device coupled to a network, the first input and output device being configured to send and receive Internet communication messages;

means for receiving the Internet communication messages at a relay station and means for establishing a communication session between the first input and output communication device and the relay station without analog communications;

means for communicating with a second input and output communication device over a plain old telephone system network communications based on the communications received from the first input and output communication device; and means for generating a dummy call to signal the relay station of an IP call.

10. The system of claim 9, wherein the communication between the first input and output communication device and the relay communication device is communicated using Internet protocol (IP).

11. The system of claim 9, further comprising means for tracking elapsed minutes in communication with the relay station.

* * * * *

UNITED STATES PATENT AND TRADEMARK OFFICE
CERTIFICATE OF CORRECTION

PATENT NO.         : 7,245,705 B2                                    Page 1 of 1
APPLICATION NO. : 10/788237
DATED                : July 17, 2007
INVENTOR(S)       : Greg E. Stephens and Wayne D. Hinerman It is certified that error appears in the above-identified patent and that said Letters Patent is hereby corrected as shown below:

<u>Col. 1, lines 51-52:</u>

Delete the phrase "to use computerize chat interfaces" and replace it with --to use computerized chat interfaces--.

<u>Col. 6, line 60:</u>

Delete the word "keyboards" and replace it with --keyboard--.

<u>Col. 7, line 4:</u>

Delete the phrase "between the first and input" and replace it with --between the input--.

Signed and Sealed this

Twenty-fourth Day of February, 2009

JOHN DOLL
*Acting Director of the United States Patent and Trademark Office*